(12) United States Patent
Do et al.

(10) Patent No.: US 9,253,396 B2
(45) Date of Patent: Feb. 2, 2016

(54) VARIABLE GAIN COLUMN AMPLIFIER ADAPTED FOR USE IN IMAGING ARRAYS

(71) Applicant: BAE Systems Imaging Solutions Inc., Nashua, NH (US)

(72) Inventors: Hung T. Do, San Jose, CA (US); Peter Bartkovjak, San Jose, CA (US); Boyd Fowler, Sunnyvale, CA (US); Stephen W. Mims, Palo Alto, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 121 days.

(21) Appl. No.: 14/097,162

(22) Filed: Dec. 4, 2013

(65) Prior Publication Data

US 2015/0156413 A1      Jun. 4, 2015

(51) Int. Cl.
*H04N 5/3745* (2011.01)
*H04N 5/232* (2006.01)

(52) U.S. Cl.
CPC ....... *H04N 5/23232* (2013.01); *H04N 5/37455* (2013.01)

(58) Field of Classification Search
CPC ............ H04N 5/3745; H04N 5/37455; H04N 5/37457
See application file for complete search history.

(56) References Cited

U.S. PATENT DOCUMENTS

| | | | | |
|---|---|---|---|---|
| 5,602,511 A * | 2/1997 | Woolaway | | 330/282 |
| 5,844,512 A * | 12/1998 | Gorin et al. | | 341/139 |
| 6,642,496 B1 * | 11/2003 | Gulbransen | | 250/208.1 |
| 6,757,018 B1 * | 6/2004 | Fowler | | 348/301 |
| 7,268,338 B2 * | 9/2007 | Liu et al. | | 250/214 AG |
| 7,605,376 B2 | 10/2009 | Liu | | |
| 7,667,176 B2 * | 2/2010 | Olsen et al. | | 250/208.1 |
| 7,825,975 B2 | 11/2010 | Fowler | | |
| 7,965,208 B2 * | 6/2011 | McLoughlin | | 341/139 |
| 8,767,105 B2 * | 7/2014 | Rossi | | 348/300 |
| 2002/0066848 A1 | 6/2002 | Fowler | | |
| 2002/0134918 A1 * | 9/2002 | Miida | | 250/214.1 |
| 2004/0207739 A1 * | 10/2004 | Rossi | | 348/300 |
| 2005/0259167 A1 * | 11/2005 | Inoue et al. | | 348/300 |
| 2007/0007438 A1 * | 1/2007 | Liu et al. | | 250/214 AG |
| 2010/0157124 A1 * | 6/2010 | Inoue et al. | | 348/300 |
| 2010/0302407 A1 * | 12/2010 | Ayers et al. | | 348/230.1 |
| 2011/0007198 A1 * | 1/2011 | Rossi | | 348/300 |

* cited by examiner

Primary Examiner — Nicholas Giles

(74) Attorney, Agent, or Firm — Calvin B. Ward

(57) ABSTRACT

An imaging sensor using a novel bit line processing circuit, that circuit, and the method of processing the pixel outputs from an image sensor using that processing circuit are disclosed. The image sensor includes an array of pixel sensors, a signal digitizing circuit, and a digitizing controller. Each pixel sensor generates a voltage signal that is a function of a charge on the photodetector in that pixel sensor, and couples that voltage signal to a bit line in response to a first signal. The signal digitizing circuit is connected to the bit line, the digitizing circuit converting the voltage signal to a plurality of output digital values, the output digital values having selectable levels of digitization noise. The digitizing controller generates the level of noise based on the voltage signal. The signal digitizing circuit includes a variable gain amplifier and an ADC having a fixed number of bits.

12 Claims, 5 Drawing Sheets

VARIABLE GAIN COLUMN AMPLIFIER ADAPTED FOR USE IN IMAGING ARRAYS

BACKGROUND OF THE INVENTION

Low cost imaging arrays fabricated in CMOS are utilized in numerous cameras. In digital photography, the image is recorded by an imaging array in which each pixel includes a photodetector that measures the amount of light that falls on some portion of the pixel area. Imaging arrays that have a high dynamic range are required for many applications, including scientific research photography. The dynamic range of an imaging array will be defined to be the ratio of the maximum signal for a pixel to the minimum signal that is above the noise.

Typically, the imaging arrays are constructed from a two-dimensional array of pixel sensors organized as a plurality of rows and columns of pixel sensors. All of the pixel sensors in a given column are connected to a common signal line. The specific pixel in a column that is currently being readout is determined by a row select signal that connects all of the pixel sensors in a given row to their respective signal lines.

To improve the readout time of the array, each signal line has a dedicated signal amplifier and readout circuit so that the entire row of pixel sensors can be readout in parallel. The readout amplifier and associated analog-to-digital converters (ADCs) must have a dynamic range that is commensurate with the dynamic range of the individual pixels and must provide a readout time for each pixel that is as short as possible, particularly in low light images, as the noise in each pixel value increases with the time between the end of an exposure and the time the pixel is readout. To increase the dynamic range of the readout circuit, schemes in which multiple readout amplifiers are used on each signal line have been proposed. For example, U.S. patent application Ser. No. 12/036,998 filed Feb. 25, 2008 describes a readout system in which digitization circuits having different gains are implemented for each readout line, the choice of digitization gain being determined by the signal on the readout line in question.

While multiple readout digitization circuits can provide improved dynamic range, the improvement comes with a significant cost, since the number of transistors that must be included in the processing circuitry for each signal line is substantially increased. Since there can be thousands of columns of pixels, hence, signal lines, each additional transistor represents a significant increase in the area of silicon required to implement the readout array, and hence, the cost of the image sensor.

SUMMARY OF THE INVENTION

The present invention includes an imaging sensor using a novel bit line processing circuit, that processing circuit, and the method of processing the pixel outputs from an image sensor using that processing circuit. The image sensor includes an array of pixel sensors, a signal digitizing circuit, and a digitizing controller. Each pixel sensor in the array of pixel sensors includes a photodetector, a charge conversion circuit, and a gate transistor, the charge conversion circuit generating a voltage signal that is a function of a charge on the photodetector, and the gate transistor coupling the voltage signal to a bit line in response to a first signal. The signal digitizing circuit is connected to the bit line, the digitizing circuit converting the voltage signal to a plurality of output digital values, said output digital values having selectable levels of digitization noise, one of the levels of digitization noise being selected in response to an output selection signal used with each signal value. The digitizing controller generates the output control signal based on the voltage signal. The signal digitizing circuit includes a variable gain amplifier having a plurality of gain values that amplifies the voltage signal to generate an amplified signal that is digitized by an ADC having a fixed number of bits. In one aspect of the invention, the variable gain amplifier includes a capacitive transimpedance amplifier having a feedback capacitance that is determined by the output control signal.

DETAILED DESCRIPTION OF THE PREFERRED EMBODIMENTS OF THE INVENTION

Figure 1:
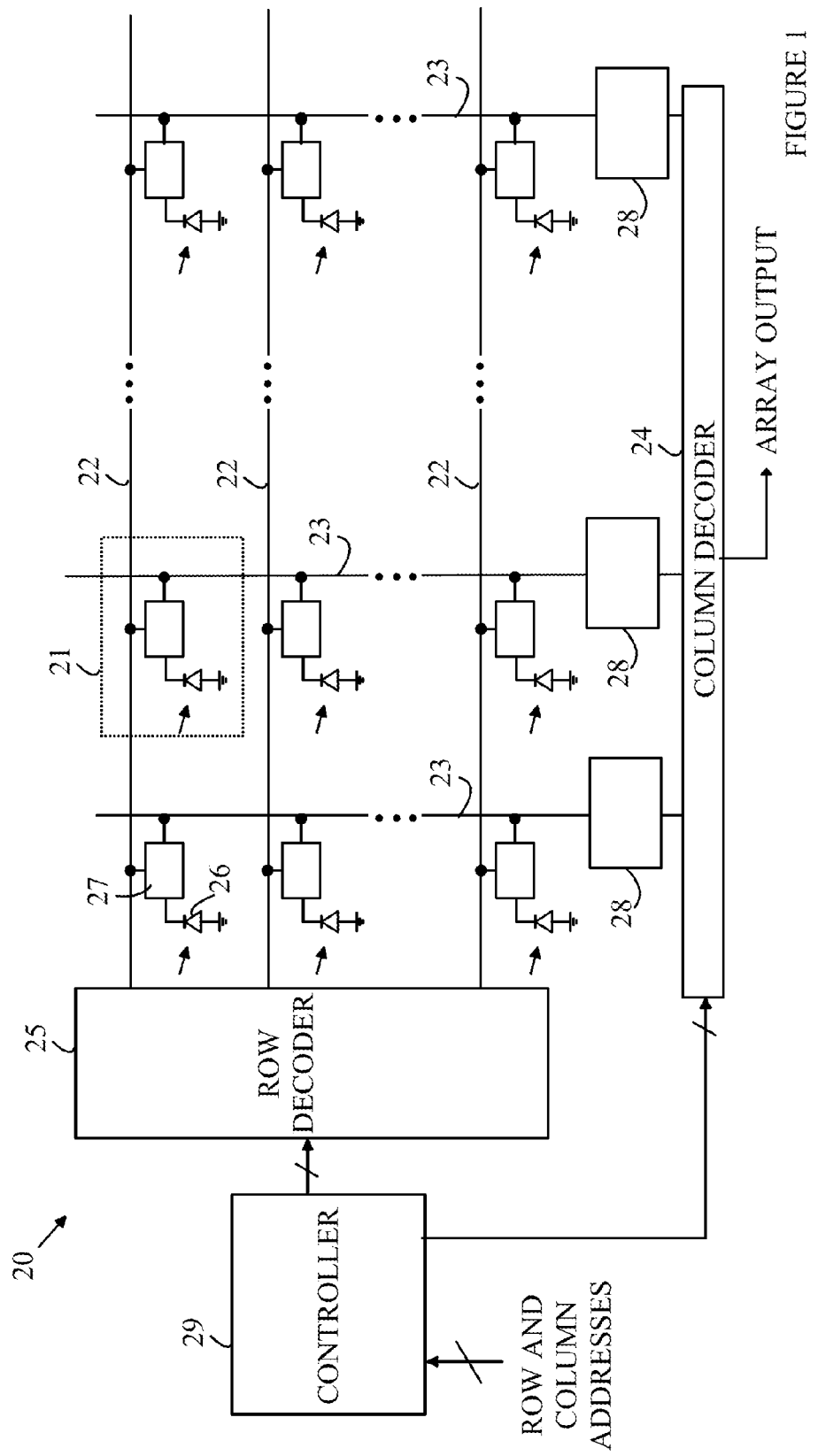
FIG. 1 illustrates a block diagram of one embodiment of a CMOS imaging array according to the present invention.

The manner in which the present invention provides its advantages can be more easily understood with reference to FIG. 1, which is a block diagram of one embodiment of a CMOS imaging array according to the present invention. Imaging array 20 is constructed from a rectangular array of pixel sensors 21. Each pixel sensor includes a photodiode 26 and an interface circuit 27. The details of the interface circuit depend on the particular pixel design. However, all of the pixel circuits include a gate that is connected to a row line 22 that is used to connect that pixel to a bit line 23. The specific row that is enabled at any time is determined by a bit address that is input to a row decoder 25.

The various bit lines terminate in a column processing circuit 28 that typically includes sense amplifiers and ADCs. Each sense amplifier reads the signal produced by the pixel that is currently connected to the bit line processed by that sense amplifier. At any given time, a single pixel sensor is readout. The specific column that is readout is determined by a column address that is utilized by a column decoder 24 to connect the ADC output from that column to circuitry that is external to the imaging array. The overall operation of the imaging array is controlled by a controller 29 that receives the row and column addresses and other commands on an input bus.

Figure 2:
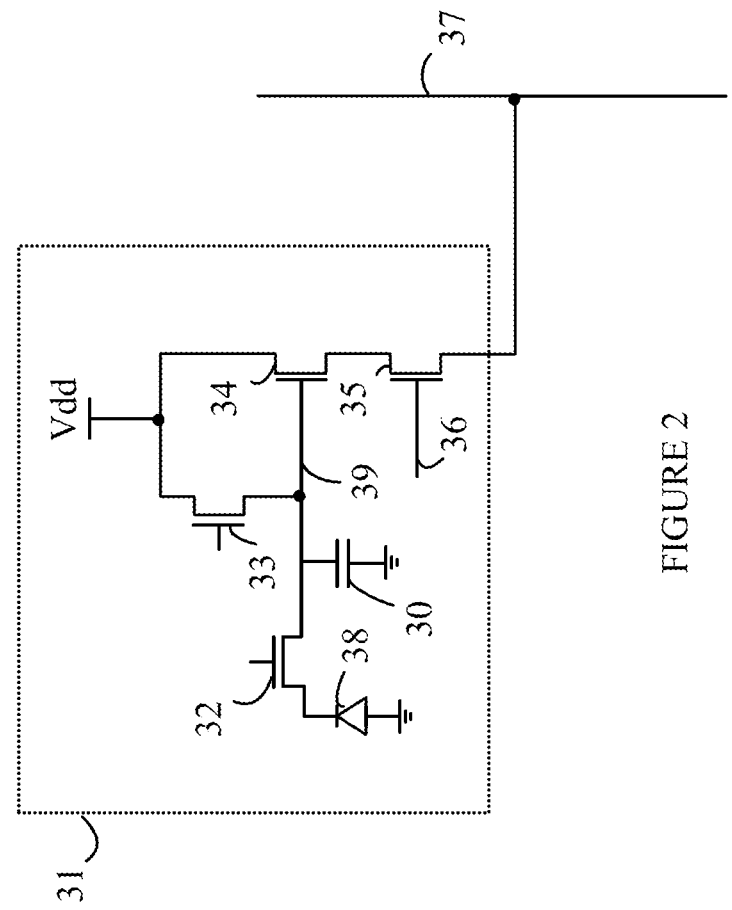
FIG. 2 illustrates a schematic drawing of an exemplary pixel sensor that can be utilized in an imaging array.

Refer now to FIG. 2, which is a schematic drawing of an exemplary pixel sensor that can be utilized in imaging array 20. Pixel sensor 31 includes a photodiode 38, which is preferably a pinned photodiode, that is coupled to a floating diffusion node 39 by gate 32. During the exposure of the imaging array to the image being recorded, charge accumulates in photodiode 38. The accumulated charge is transferred to floating diffusion node 39 by applying a signal to gate 32. The charge transferred to floating diffusion node 39 is converted to voltage by the parasitic capacitor 30 associated with the gate of transistor 34, which is connected as a source follower. Transistor 34 provides the gain needed to drive bit line 37 when pixel sensor 31 is connected to that bit line via a signal on row select line 36 that is coupled to the gate of transistor 35. Prior to transferring charge from photodiode 38 to floating diffusion node 39, the potential on floating diffusion node 39 is reset to a predetermined potential via gate 33. When charge is transferred from photodiode 38 to the reset floating diffusion node 39, the voltage on floating diffusion node 39 is reduced by an amount that depends on the charge that was transferred and the capacitance of the floating diffusion node. However, there are small variations in the final voltage on floating diffusion node 39 after the reset.

A procedure known as correlated double sampling is used to compensate for these variations. The potential on floating diffusion node 39 after floating diffusion node 39 has been reset is measured by connecting pixel sensor 31 to bit line 37. After this starting potential is measured, the charge that accumulated on photodiode 38 is transferred to floating diffusion node 39 and the potential on floating diffusion node 39 is again measured by connecting pixel sensor 31 to bit line 37. The difference in the signal between the two potential measurements determines the light intensity value that is reported for pixel sensor 31.

As noted above, it is advantageous to provide a digitization circuit for each bit line in which the digitization gain is a function of the signal strength from the pixel. In general, there are two sources of noise in each pixel measurement. The first is the sensor noise of the photodiode and the analog readout circuitry, and the second results from the finite steps of the ADC used to convert the analog measurements to the final digital values for the pixels. The sensor noise is the sum of the shot noise from the photodetector, and thermal and 1/f noise from the readout electronics. Shot noise typically dominates the sensor noise for signal levels above ten photons. The output of the ADC has an uncertainty of one half the voltage difference corresponding to the least significant bit of the digital value. This uncertainty will be referred to as the "quantization noise" in the following discussion.

Advances in CMOS imaging technology have resulted in image sensors with extremely low sensor noise levels, corresponding to the signal that would be produced from receiving as few as two photons. To take advantage of an array with such low noise pixels at low light levels, a digitization circuit having low quantization noise and high gain should be utilized. If such a digitization circuit is used to convert signals from pixels having high light intensities, however, the output voltages will be too high for conventional low cost CMOS circuitry to process. In addition, the ADCs would need to have a large number of bits, which further increases the cost and area of silicon required. If, on the other hand, the amplifier gain in the digitization circuit is set to a low value to maintain the signal within the range of CMOS circuitry when the analog signals from high intensity pixels are processed, the quantization noise will mask the low level signals. Hence, schemes in which ADCs that provide a variable quantization noise have been proposed. The prior art schemes discussed above utilize two ADCs having differing conversion gains with the gains being switched in response to the signal level from the pixel being processed so that low level signals are processed with smaller step sizes in the ADCs.

Figure 3:
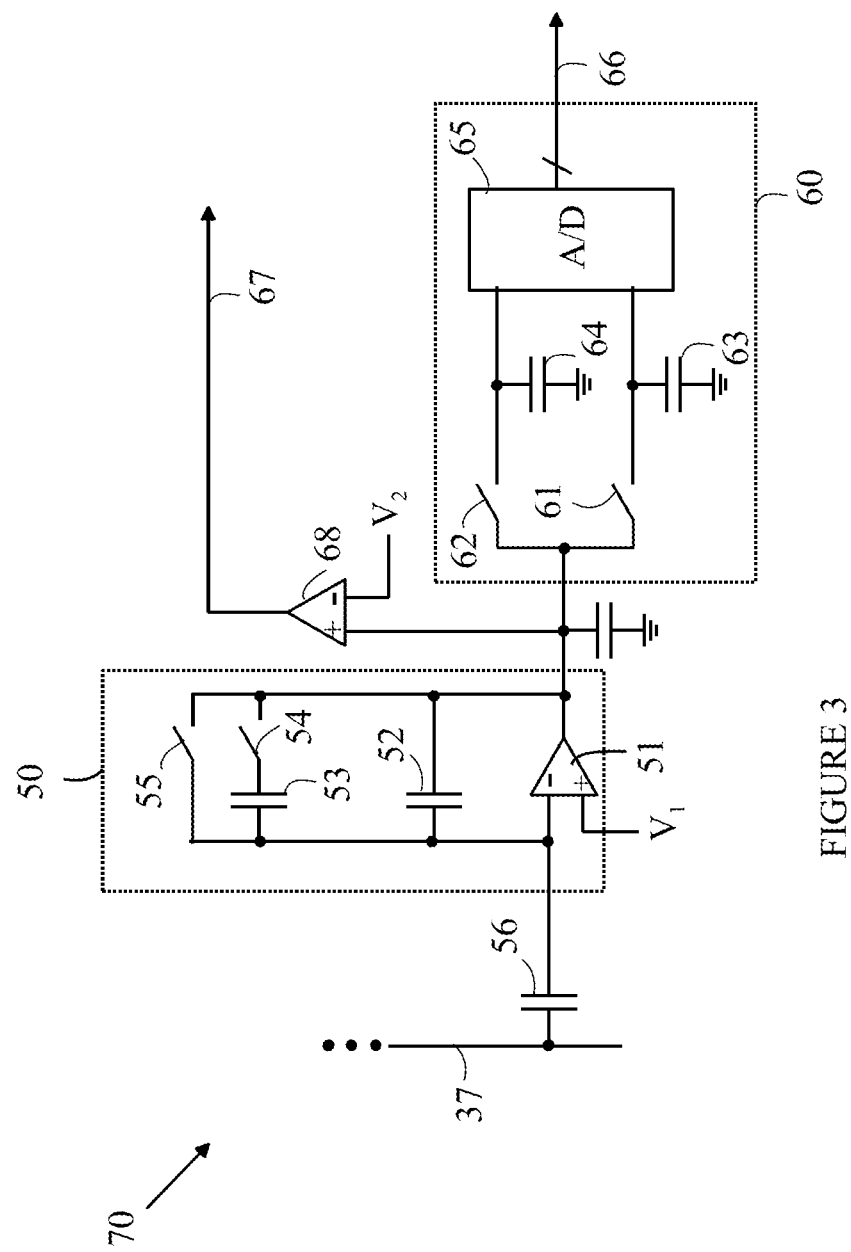
FIG. 3 illustrates a schematic drawing of a column processing circuit according to one embodiment of the present invention.

The present invention is based on the observation that a column processing circuit that provides different levels of quantization noise can be constructed from a single capacitive transimpedance amplifier with variable gain and a fixed step size ADC. Increasing the gain of the capacitive transimpedance amplifier when low light level pixels are being processed is equivalent to decreasing the step size in the ADC, and hence, reducing the digitization noise level. Refer now to FIG. 3, which is a schematic drawing of a column processing circuit according to one embodiment of the present invention. Column processing circuit 70 amplifies and processes the signals on bit line 37. Capacitive transimpedance amplifier 50 is constructed from an operational amplifier 51 and two feedback capacitors shown at 52 and 53 having capacitances $C_{52}$ and $C_{53}$, respectively. When switch 54 is open, the gain of capacitive transimpedance amplifier 50 is proportional to $C_{56}/C_{52}$, where $C_{56}$ is the capacitance of capacitor 56. When switch 54 is closed, capacitors 52 and 53 are connected in parallel, and the gain of capacitive transimpedance amplifier 50 is proportional to $C_{56}/(C_{52}+C_{33})$. The state of switch 54 is set by latching comparator 68 that compares the output of capacitive transimpedance amplifier 50 with a reference voltage, $V_2$. In one embodiment, $C_{56}/(C_{52}+C_{53})$ is approximately 1, and $C_{56}/C_{52}$ is between 20 and 30.

In operation, switch 54 is controlled by the output of a latching comparator shown at 68 and by controller 29 shown in FIG. 1. Prior to each voltage measurement on bit line 37, latching comparator 68 is reset and switch 55 is closed to short the input and output of operational amplifier 51. Initially, switch 54 is open, and operational amplifier 51 has its maximum gain. When a signal is transferred to capacitor 56 for measurement, the output of operational amplifier 51 rises. If the output of operational amplifier 51 exceeds $V_2$, latching comparator 68 is set thereby generating a signal on line 67 which is used to close switch 54. The gain of capacitive transimpedance amplifier 50 is thus reduced to the low value. After capacitive transimpedance amplifier 50 has settled, the output voltage is stored on either capacitor 63 or capacitor 64 in double sampling circuit 60 depending on the state of switches 61 and 62, respectively. When both the reset value and the value representing the stored charge on the photodiode in the pixel currently connected to bit line 37 are stored on capacitors 64 and 63, respectively, the difference in potential is digitized by ADC 65 and the value output on line 66 together with a value indicative of the gain value of capacitive transimpedance amplifier 50 on line 67.

When the light level stored in the pixel that is connected to bit line 37 is low, capacitive transimpedance amplifier 50 and the associated correlated double sampling circuitry behave as a conventional column processing circuit in that the gain of capacitive transimpedance amplifier 50 is at the high value for both the reset and measurement phases of the correlated double sampling. When the light level is high; however, the gain used to measure the reset potential will be different than the gain used to measure the charge that was transferred from the photodiode. Hence, the difference computation will be in error. In many cases, this does not cause a significant problem, because the correlated double sampling computation only provides a significant difference from the value that would be obtained by just measuring the charge that was stored in the photodiode in cases where the photodiode charge is small. However, if a correction for this error is needed, a modified double sampling circuit in which the observed reset value is divided by an appropriate factor that depends on the difference in gain of the two phases can be utilized. Such a circuit will be discussed in more detail below.

Figure 4:
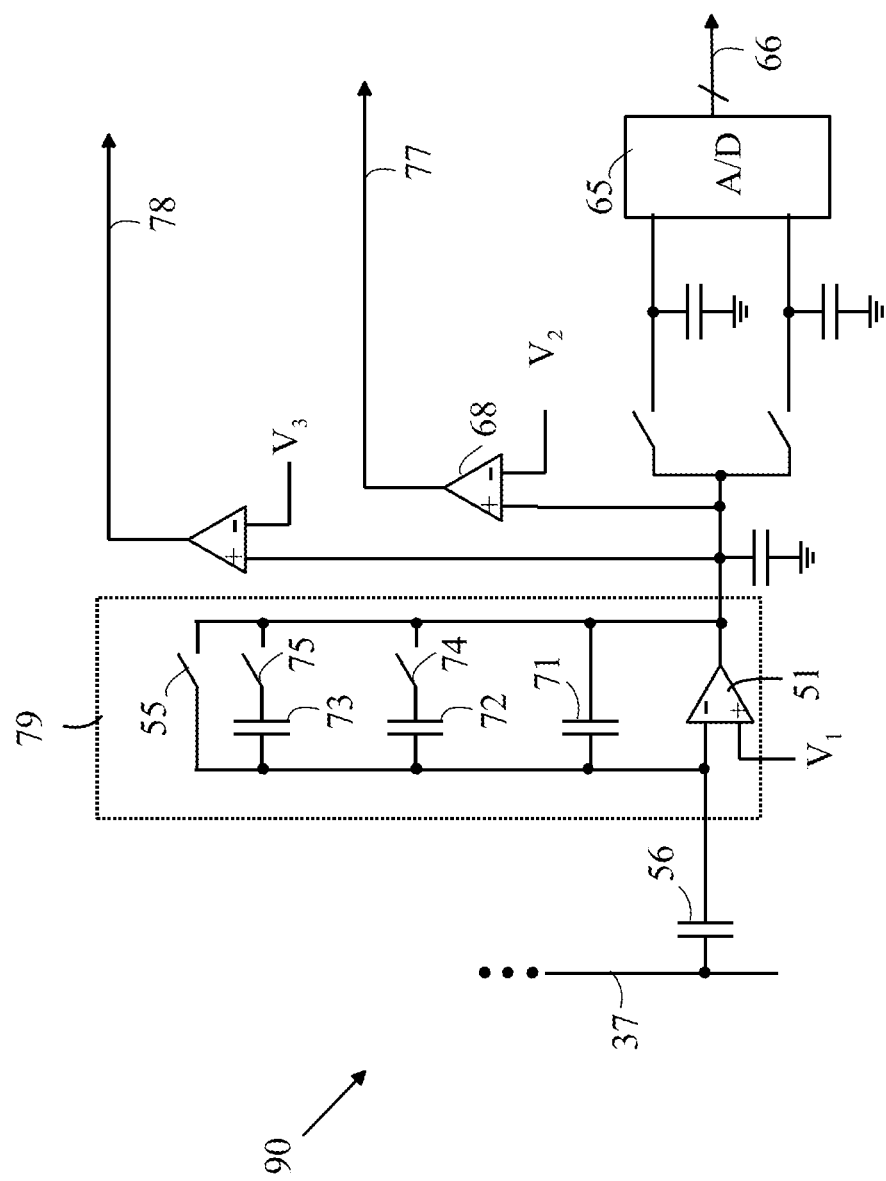
FIG. 4 illustrates a column processing circuit having a capacitive transimpedance amplifier with three gain levels.

Capacitive transimpedance amplifier 50 can be viewed as a capacitive transimpedance amplifier with a variable capacitive feedback circuit as the feedback loop. The feedback capacitance is set to maintain the output signal below a predetermined signal level. Embodiments in which more than two capacitance levels are utilized can also be constructed to further increase the dynamic range of the capacitive transimpedance amplifier. Refer now to FIG. 4, which illustrates a column processing circuit having a capacitive transimpedance amplifier with three gain levels. Column processing circuit 90 includes a capacitive transimpedance amplifier 79 having three feedback capacitors shown at 71-73. Feedback capacitors 72 and 73 are switched into the feedback loop by switches 74 and 75, respectively, in response to the output of operational amplifier 51 exceeding $V_2$ and $V_3$, respectively. The signals on output lines 77 and 78 are readout together with the output of ADC 65.

Figure 5:
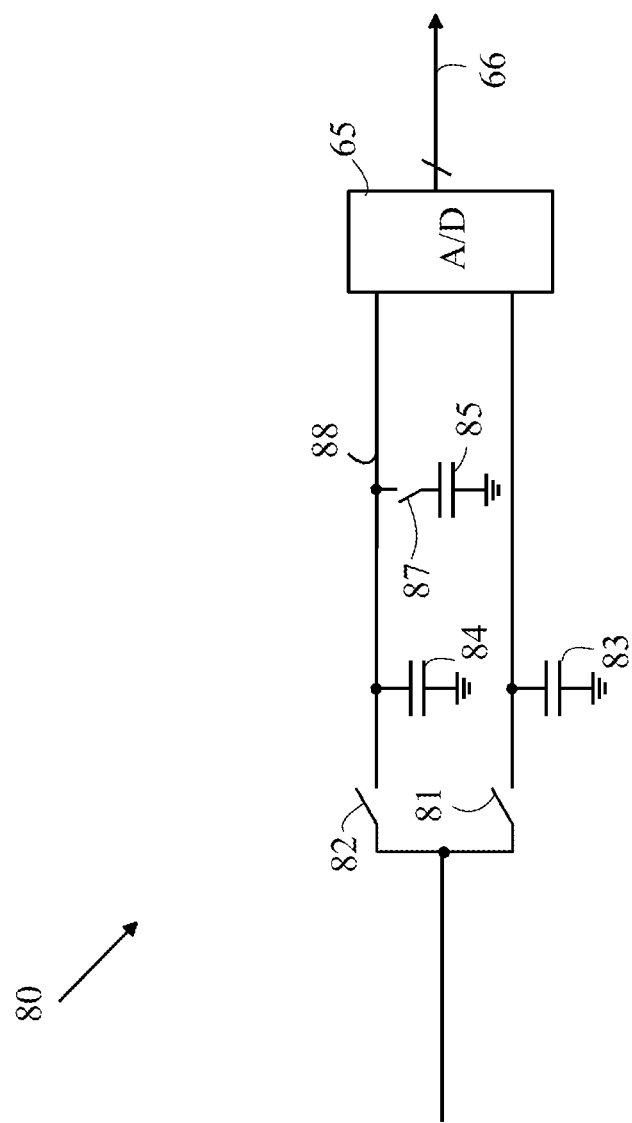
FIG. 5 illustrates one embodiment of a double sampling circuit that can be used with the present invention to correct for a switch in gain of the column processing circuit.

As noted above, a first voltage representing the reset voltage is stored in the double sampling circuit prior to the column processing circuit determining the final gain of the capacitive transimpedance amplifier. If the gain is subsequently reduced to a lower gain in response to a high signal being detected, the reset voltage will be too high by a factor of the ratio of the gains in the high gain state and the state in which the reset voltage was stored. Refer now to FIG. 5, which illustrates one embodiment of a double sampling circuit that can be used with the present invention to correct for a switch in gain of the column processing circuit. Double sampling circuit 80 assumes that the gain in the column processing circuit is limited to two values, a high gain, $G_H$, that is used during the measurement of the reset voltage in the pixel currently connected to the bit line, and at the beginning of the measurement of the light signal, and a low gain, $G_L$, that used if the signal in the high gain mode is greater than a predetermined threshold during the measurement of the light signal.

The processing of the pixel is divided into two phases, a reset phase and a light measurement phase. During the reset phase, switches 81 and 82 are closed. The signal from the pixel is stored on capacitor 84 during this phase using gain $G_H$. An identical signal is stored on capacitor 83. During the light measurement phase, switch 82 is open, and the potential on capacitor 84 is the measured reset potential. The signal on capacitor 83 at the end of the light measurement phase will depend on the gain of the capacitive transimpedance amplifier at the end of the light measurement phase. If the gain remained at $G_1$, the switch 87 remains open. In this case ADC 65 outputs the difference in the two input signals as measured with the $G_H$ gain. If, however, the gain changed from $G_H$ to $G_L$ during the light measurement phase, switch 87 is closed. Since switch 82 is open, the voltage on line 88 will be reduced by a factor that depends on the capacitance of capacitor 85. The capacitance of capacitor 85 is chosen such that the voltage on line 88 is multiplied by a factor of $G_L/G_H$, hence correcting for the different gains in the reset and light measurement phases.

In embodiments in which the column processing circuitry has more than two gain values, a double sampling circuit analogous to that shown in FIG. 5 can also be constructed. In the case of additional gains, capacitor 85 can be replaced by a variable capacitance having a value that depends on the highest gain used during the light measurement phase. In the case of double sampling circuit 80, the combination of switch 87 and capacitor 85 is a variable capacitance that has two values, 0 and a capacitance that provides the desired division of the stored voltage. While the double sampling circuits described above utilize a variable capacitance to divide the measured reset voltage by the desired factor, other forms of a voltage divider could be utilized. The advantage of the capacitive system lies in its simplicity.

The above-described embodiments utilize a two-dimensional array of pixels in which each column of pixels is processed by a column processing circuit. However, the present invention can be utilized with any arrangement of pixels in which a plurality of pixels that are exposed to significantly different illumination levels share the same signal digitizing circuit via a common input line. In addition, other forms of photodetectors could be utilized in the pixels.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
an array of pixel sensors, each pixel sensor comprising a photodetector, a charge conversion circuit, and a gate transistor, said charge conversion circuit generating a voltage signal that is a function of a charge on said photodetector, and said gate transistor coupling said voltage signal to a bit line in response to a first signal;
a signal digitizing circuit connected to said bit line, said digitizing circuit converting said voltage signal to a plurality of output digital values, said output digital values having a plurality of selectable levels of quantization noise, one of said selectable levels of quantization noise being selected in response to an output control signal; and
a digitizing controller that generates said output control signal based on said voltage signal, wherein said digitizing controller comprises a variable gain amplifier having a plurality of gain values that amplifies said voltage signal to generate an amplified signal that is digitized by an analog-to-digital converter (ADC) having a fixed number of bits.

2. The apparatus of claim 1 further comprising a double sampling circuit that stores a first voltage that represents a measurement of a reset voltage measured at a first gain value and a second voltage that measures said voltage signal, said double sampling circuit outputting a measurement of said amplified signal minus said first voltage divided by a factor that depends on which of said plurality of gain values was used to generate said amplified signal.

3. The apparatus of claim 1 wherein said variable gain amplifier comprises a capacitive transimpedance amplifier having a feedback capacitance that is determined by said output control signal.

4. The apparatus of claim 3 wherein said digitizing controller comprises a latching comparator that compares an output of said capacitive transimpedance amplifier to a reference value.

5. The apparatus of claim 4 wherein said output digital values comprise a value indicative of said output control signal.

6. An apparatus comprising:
a signal digitizing circuit connected to an input line, said signal digitizing circuit converting a voltage signal on said input line to a plurality of output digital values, each output digital value having a different level of digitization noise, one of said output digital values being selected for output in response to an output control signal; and
a digitizing controller that generates said output control signal based on said voltage signal, wherein said signal digitizing controller comprises an amplifier having a plurality of gain values that amplifies said voltage signal to generate an amplified signal that is digitized by an analog-to-digital converter (ADC) having a fixed number of bits.

7. The apparatus of claim 6 wherein said variable gain amplifier comprises a capacitive transimpedance amplifier having a feedback capacitance that is determined by said output control signal.

8. The apparatus of claim 7 wherein said output selection signal comprises a latching comparator that compares an output of said capacitive transimpedance amplifier to a reference value.

9. The apparatus of claim 8 wherein said output digital values comprise a value indicative of said output control signal.

10. A method for operating an imaging array comprising an array of pixel sensors, each pixel sensor comprising a photodetector, a charge conversion circuit, and a gate transistor, said charge conversion circuit generating a voltage signal that is a function of a charge on said photodetector, and said gate transistor coupling said voltage signal to a bit line in response to a first signal, said method comprising:

coupling one of said pixel sensors to said bit line;

amplifying said voltage signal corresponding to said one of said pixel sensors with a variable gain capacitive transimpedance amplifier to generate an output analog signal, said variable gain capacitive transimpedance amplifier having a variable gain determined by said voltage signal; and digitizing said output analog signal with an analog-to-digital converter (ADC) having a fixed number of bits.

11. The method of claim 10 further comprising storing a first voltage that represents a reset voltage measured at a first gain value and a second voltage that measures said output analog signal; and correcting said output analog signal by an amount that depends on said first voltage divided by a factor that depends on said variable gain.

12. The method of claim 10 wherein said variable gain capacitive transimpedance amplifier has a capacitive feedback circuit having a plurality of different capacitance values and said capacitive feedback circuit has a capacitance that is set by selecting one of said different capacitance values in response to said voltage signal being coupled to said bit line.

* * * * *